March 6, 1962 E. HARVENGT 3,023,902

AUTOMATIC DISCHARGE FOR MAGNETIC MEDIUM SEPARATORS

Filed Feb. 13, 1958 6 Sheets-Sheet 1

Inventor
E. Harvengt
By Glascock Downing & Seebold
Attys.

March 6, 1962 E. HARVENGT 3,023,902

AUTOMATIC DISCHARGE FOR MAGNETIC MEDIUM SEPARATORS

Filed Feb. 13, 1958 6 Sheets-Sheet 2

Inventor
E. Harvengt
By Glascock Downing Seebold
Attys.

AUTOMATIC DISCHARGE FOR MAGNETIC MEDIUM SEPARATORS

Filed Feb. 13, 1958

Inventor
E. Harvengt
By Glascock Downing & Seebold
Attys.

Inventor
E. Harvengt
By Glascock Downing & Seebold
Attys.

Inventor
E. Harvengt
By Glascock Downing & Seebold
Attys.

March 6, 1962 E. HARVENGT 3,023,902

AUTOMATIC DISCHARGE FOR MAGNETIC MEDIUM SEPARATORS

Filed Feb. 13, 1958

6 Sheets-Sheet 6

Inventor
E. Harvengt
By Glascock Downing Seebold
Attys.

United States Patent Office 3,023,902

Patented Mar. 6, 1962

3,023,902

AUTOMATIC DISCHARGE FOR MAGNETIC MEDIUM SEPARATORS

Edmond Harvengt, 126 Rue de la Station, Moustier-sur-Sambre, Belgium

Filed Feb. 13, 1958, Ser. No. 715,149
Claims priority, application Belgium Apr. 4, 1957
16 Claims. (Cl. 209—172.5)

This invention relates to treatment apparatus, for example, apparatus for the treatment of granular material and has particular reference to the wet treatment of granular material, for example, ore, coal and other minerals.

In wet treatment apparatus in which separation is effected between light and heavy products of a material undergoing treatment it is normally essential to secure the discharge of products through discharge orifices in the lower part of the apparatus without at the same time permitting an excessive discharge of liquid treatment medium necessitating replacement of substantial volumes of the latter.

It is an object of the present invention to provide an improved method and apparatus for the treatment of granular material.

According to the present invention treatment apparatus consists of a vessel having a discharge orifice and means for establishing a magnetic field within the orifice sufficient to control a discharge therefrom.

Means may be provided for varying the intensity of the magnetic field which may, for example, be produced by an electromagnet. Variations of the magnetic field may also be varied in dependence upon a discharge from the orifice.

The treatment apparatus may be used with a liquid treatment medium containing particles having magnetic properties such as particles of ferro-silicon, ferro-nickel, and magnetite. Alternatively, a suspension of such particles may be introduced into the vessel at a point adjacent the orifice.

Embodiments of the invention will now be described in greater detail, by way of example only, and with reference to the accompanying drawings of which:

FIG. 1 shows in schematic form the invention applied in the so-called "heavy media" or dense liquor treatment plant which is generally conventional and having a conical separating vessel 1 fitted with a mixer indicated diagrammatically at 2 for maintaining the contents of the vessel 1 homogeneous.

Figure 1:
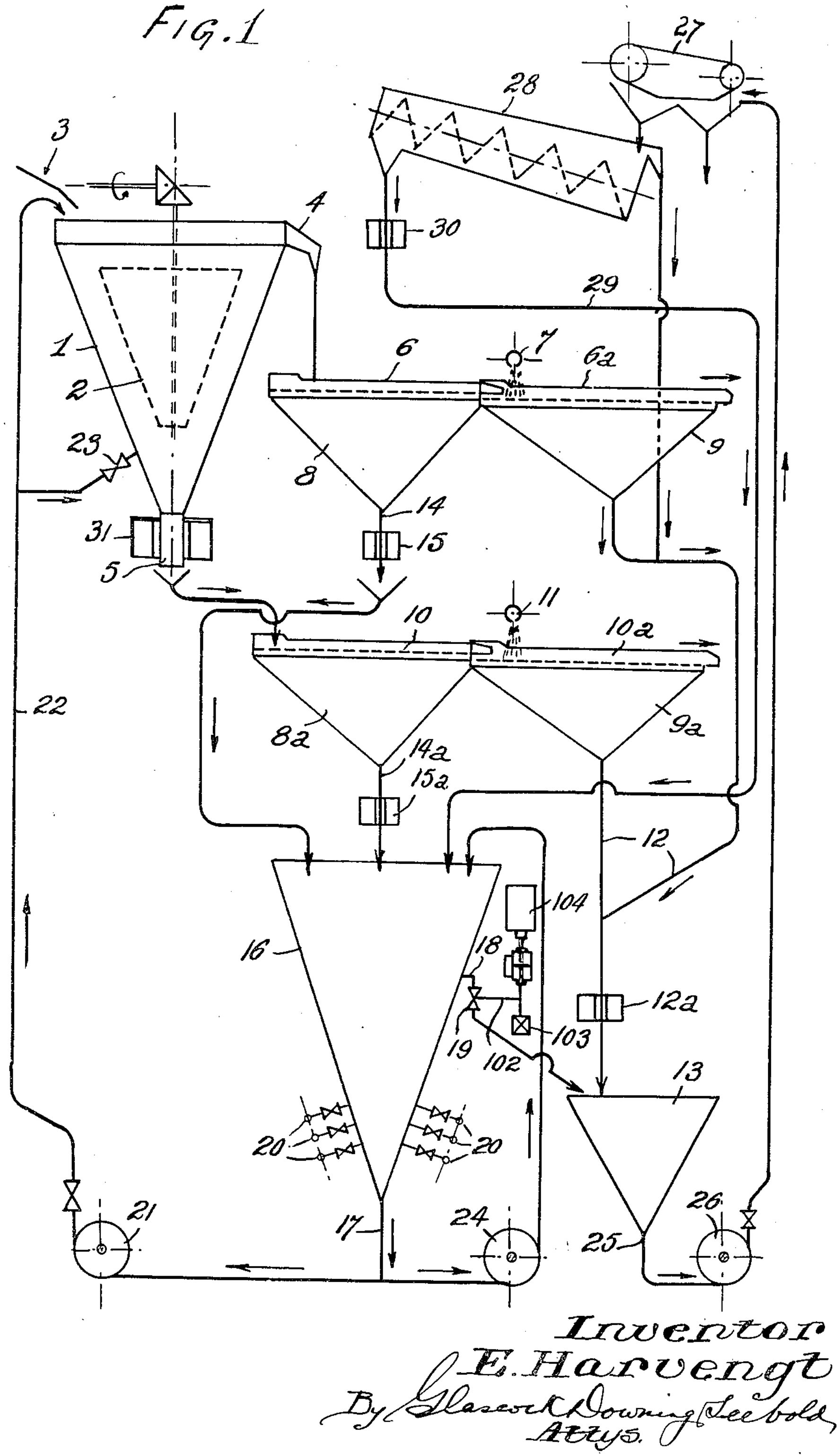
FIG. 1 is a diagrammatic view of a plant for treating granular materials, in particular ores, the treatment being carried out in a cone using dense liquor.

The dense liquor is formed by a suspension of suitable density composed of a liquid, for example, water, and particles of materials having magnetic properties, for example, ferro-silicon, ferro-nickel, magnetite.

Granular material to be treated is fed into vessel 1 via chute 3. 4 designates an upper outlet for light products resulting from treatment of the material in vessel 1 while 5 is a lower outlet for the discharge of heavy products.

Light products discharged at 4 pass on to a screen 6 where the major part of the solid particles forming the suspension are separated therefrom and reach the trough 8, the light products passing to an adjacent screen *6a* where they are washed by means of water spray nozzles 7. Below the screen *6a* is a trough 9 into which pass the remainder of the solid particles forming the suspension.

The discharge from outlet 5 is fed on to a screen 10 where the major part of the solid particles forming the suspension are separated from the heavy products and reach the trough *8a* the heavy products passing on to an adjacent screen *10a* where they are washed by water from spray nozzles 11. The solid particles forming the suspension from the screen *10a* pass into trough *9a* and proceed with the liquid in which they are entrained via a conduit 12 into a tank 13. The conduit 12 is fitted with a demagnetizing coil *12a*.

From the troughs 8, *8a* the solid particles forming the suspension pass with the entrained water through conduits 14, *14a* respectively fitted with demagnetizing coils 15, *15a* respectively to a tank 16. Tank 16 has a capacity sufficient to receive all the liquid medium in vessel 1 and has a lower outlet 17, an intermediate outlet 18 fitted with a regulating valve 19 and means 20 for maintaining in a homogeneous condition the contents of the tank 16. The means 20 take the form of injectors for passing compressed air into the tank 16.

To the outlet 17 is connected a pump 21 for pumping liquor from outlet 17 via conduit 22 to the vessel 1 both at an upper level therein and at an intermediate level as indicated at 23. As seen in FIG. 1, there is also a second pump 24 joined to outlet 17 for providing a continuous circulation of liquor in tank 16.

Discharge from tank 16 via outlet 18, controlled as stated above by valve 19, passes to vessel 13 to the lower outlet 25 of which is connected a pump 26 carrying the material from the tank to a magnetic separator indicated diagrammatically at 27. In separator 27, particles having magnetic properties are separated and passed to an apparatus 28 together with the liquor. The apparatus 28 conditions or regulates the density of the liquor and predetermined quantities of the latter are reintroduced into the circuit described above, particularly into tank 16 by way of conduit 29 which is equipped with a demagnetizing coil 30.

It will be understood that the medium used in the vessel 1 is appropriate to the treatment to be effected in this vessel.

Although in FIG. 1 the discharge outlet 5 is shown as cylindrical in form, it will be appreciated that other forms, for example, convergent, divergent, convergent-divergent, might be used instead provided that there is also provided means for establishing a magnetic field over part at least of the length of the outlet.

The magnetic field established at the outlet 5 acts on the magnetic particles in the liquid medium and forms or condenses those particles into a "screen," "stopper," or "dam" in the outlet. The permeability of the screen is such as to permit the discharge of heavy products but prevent escape of the liquid medium. This result is brought about by the fact that as the magnetic particles come under the influence of the magnetic field in the vicinity of outlet 5, they compact sufficiently to form the above described stopper or barrier in the passageway to prevent discharge of any of the material from the tank. However, as the heavy products of the tank mixture sink to the bottom of the tank and accumulate there, they increase the load on the magnetic particle barrier. When this load is of sufficient weight, the barrier collapses to permit the passage of the products which carry along with them some of the magnetic particles.

The magnetic field may be transverse with respect to the outlet or it may be longitudinal or it may be a combination of these directions. The field may be fixed or moving, it may, for example, revolve and it may be pulsating.

There will now be described with reference to FIGS. 4–15 various methods of controlling the magnetic field.

Figure 4:
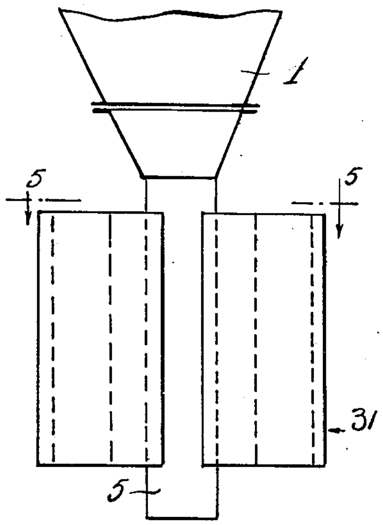
FIG. 4 is a fragmentary view, on an enlarged scale, of a discharge conduit of the treatment apparatus illustrated in FIGS. 1 to 3.
Figure 5:
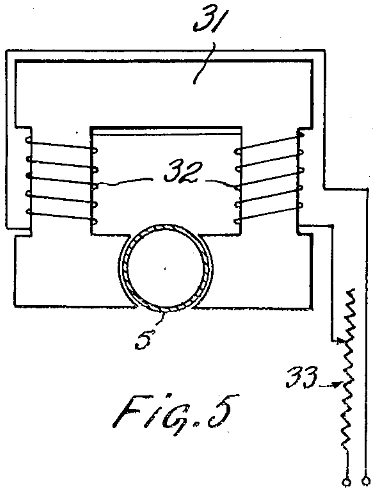
FIG. 5 is a plan and sectional view on the line 5—5 in FIG. 4.

Referring first to FIGS. 4 and 5 it will be seen that the outlet 5 is enclosed over part of its length by the poles of an electromagnet 31 having an energizing winding 32 fed from a current source (not shown) via a rheostat 33. When energised, the electromagnet produces a field of force between its poles transverse with respect to the outlet 5. The field produces a concentration of the magnetic property material in the liquid medium to form the "screen," "stopper" or "dam" referred to above.

It will be appreciated that the extent of the concentration and its "compactness" can be varied and that by suitable choice, given heavy products from the vessel 1 can pass through without excessive wastage of liquid medium. Adjustment of the rheostat 33 enables the intensity of the field to be varied thus enabling the heavy products to be discharged satisfactorily.

It will be understood that a discharge system as just described can operate without adjustment for long periods but to operate most efficiently it is desirable to incorporate some form of automatic control of field intensity.

Figure 6:
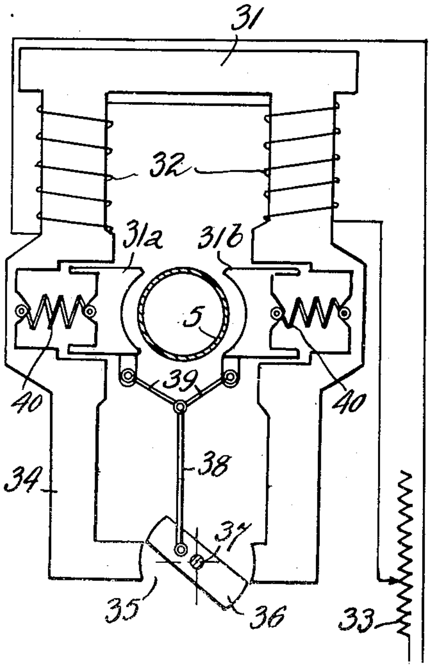

In FIG. 6 is shown one form of such automatic control. The electromagnet 31 has a pole-pieces **31*a*, 31*b* slidably mounted with respect to the rest of the electromagnet and also has a secondary magnetic circuit 34 with an air gap 35. In the gap 35 is a lever 36 of magnetic material pivotally mounted at 37 and joined by rod 38 and links 39 to the pole-pieces 31*a*, 31*b*. Springs 40 arranged as shown in FIG. 6 tend to withdraw the pole-pieces from the conduit 5**.

The arrangement of the components is such that the lever 36 normally occupies a position intermediate a position in which the lever lies along the gap 35 and one in which the lever is across the gap. Further, as can be seen, the action of the springs 40 is to tend to move the lever 36 into a position across the air gap.

A modification of the main field between the pole-pieces **31*a*, 31*b* will cause a variation in the position of the lever 36 such that for an increase in the main field there is movement of the lever towards the in-line position whilst for a decrease in the main field the lever 36** moves towards the "across" gap position.

Movement of the lever 36 effectively varies the air gap 35 a reduction or increase of whch reduces or increases its reluctance which in turn reduces or increases the strength of the main field between the pole-pieces **31*a*, 31*b***. Thus, the concentration of magnetic particles between the pole pieces may be modified and a discharge may be recommenced after a cessation or reduced if excessive.

Variation of the position of the pole-pieces **31*a*, 31*b* could be used to control the intensity of current flow through winding 32**.

It is normally desirable to set the value of the current flow through winding 32 to a value which ensures minimum escape of liquid medium and it is found that normally the only circumstance then to be dealt with is a cessation of discharge which can be dealt with by deenergising the electromagnet until discharge is recommenced.

Figure 7:
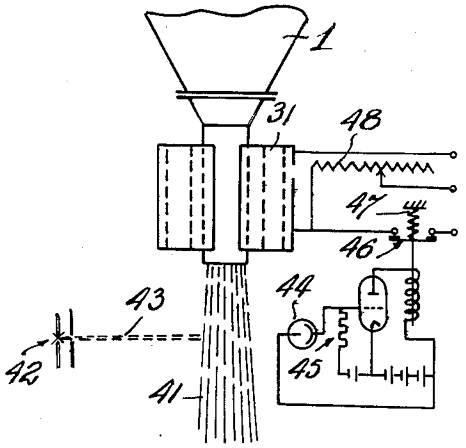
FIGS. 6 to 16 illustrate various means and devices for controlling the discharge.

FIG. 7 shows an arrangement for effecting such de-energisation and which depends upon the fact that the discharge has, usually, a marked opacity.

The arrangement of FIG. 7 includes a source of light 42 adapted to direct a beam 43 of light into the path of the discharge 41. A photo-electric cell 44 is positioned to receive light from the source 42 in the absence of the discharge 41. The output of the cell 44 is applied to a conventional amplifier 45 whose output is arranged to operate a relay whose contacts 46 are in the energising circuit of electromagnet 31. The contacts 46 are normally held closed by a spring 47.

When the discharge 41 is present it intercepts the beam 43 of light from source 42 so that cell 44 is not energised and contacts 46 are held closed. On interruption of the discharge, the beam 43 energises cell 44 whose output is amplified and operates the relay thus opening contacts 46 and the energising circuit of electromagnet 31. The electromagnet remains deenergised until discharge recommences when light beam 43 is again intercepted with the result that the output from cell 44 drops and contacts 46 close.

If it is desired to maintain a certain minimum field strength on cessation of the discharge, then a rheostat 48 (shown in FIG. 7) is inserted as shown.

Figure 8:
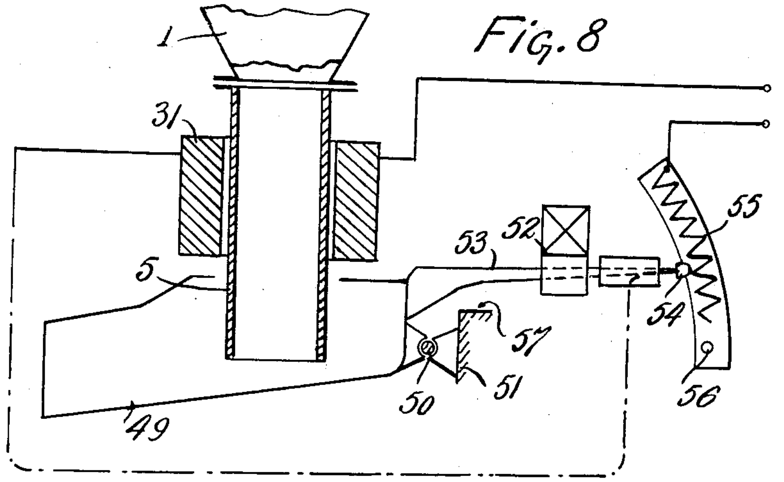

FIG. 8 shows an alternative form of control which relies on the physical action of the discharge.

Discharge is arranged to flow over a pan 49 pivotally mounted at 50 to a fixed support 51. Secured to the pan is an arm 53 carrying a counter-weight 52 and a moving contact 54 which travels along the length of a resistor 55 having an "off" terminal 56. The contact 54 controls the resistance of resistor 55 actually in series connection with the energising winding of the electromagnet 31. The arrangement is such that, normally, contact 54 is positioned about midway along resistor 55. If the rate of discharge increases the pan 49 moves in a counter-clockwise direction about pivot 50 thus decreasing the resistance in series connection thus increasing the field of the electromagnet and the concentration of magnetic particles between its poles. Conversely, if the rate of discharge decreases, the resistance increases with a resultant drop in the field and in the concentration of magnetic particles. Cessation of discharge causes a movement of the pan 49 which brings contact 54 on to the "off" terminal 56 thus de-energising the electromagnet until discharge recommences.

Energisation of the electromagnet may be subjected to periodic fluctuations and, in fact, it may be desirable to vary the concentration of the magnetic particles from that value which gives the desired rate of discharge to prevent "packing" of the particles which may stop the discharge.

Although a periodic reduction in the concentration of magnetic particles will normally lead to an increase in the discharge of liquid but the increase is not maintained and will normally be compensated partly or wholly by a decrease in liquid discharge during other parts of the cycle of periodic fluctuations.

Figure 9:
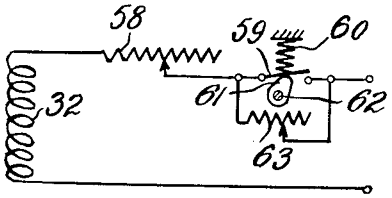

FIG. 9 shows an arrangement by which the field of the electromagnet may be changed in a periodic fashion. The energising winding 32 is connected to a source (not shown) via a rheostat 58 and a movable contact 59. The contact 59 is biassed to its closed position by a spring 60 and is opened periodically by a cam 61 mounted on a shaft 62 rotated by a mechanism (also not shown). The setting of the rheostat 58 determines the maximum intensity of the magnetic field and the latter can be reduced in value by periodic opening of the contact 59.

If it is desired to reduce the intensity without bringing it periodically to zero, a second rheostat 63 is arranged in parallel connection with the contact 59 (as shown in FIG. 9).

Figure 10:
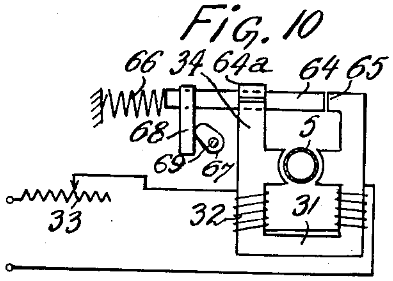

Instead of controlling the intensity of current flow through the energising winding 32, variation of field intensity can be effected magnetically and one such arrangement is shown in FIG. 10 in which the flux between the poles of the electromagnet is periodically varied.

As shown in FIG. 10 the electromagnet 31 has an auxiliary circuit 34 part of which consists of a member 64 movable in a guide **64*a* against the action of a spring 66**.

Movement is imparted to member 64 by means of a cam 67 mounted on shaft 69 and co-acting with an extension 68 adjustably mounted on the member 64. Means for rotating the shaft 69 are not shown in the drawing.

By suitable adjustment of the position of the extension 68 and the speed of rotation of the cam 67 the reluctance of the auxiliary magnetic circuit may be varied and in this manner a flux between the poles of the electromagnet can also be varied.

If additionally the rheostat 33 is adjusted to allow a current flow of higher value than that corresponding with a normal working field it is possible to produce field intensity variations whose mean value corresponds with that of a normal field.

Figure 11:
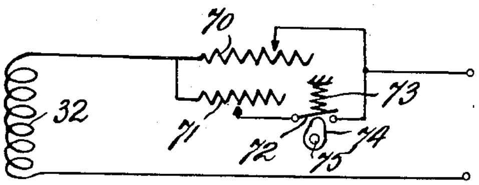
Figure 12:
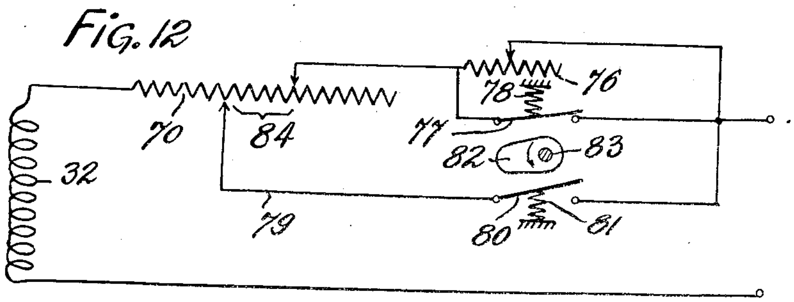

The field intensity may also be varied in a periodic fashion by controlling the current flow through the winding 32 only as shown in FIGS. 11 and 12.

In FIG. 11, winding 32 is energised via a rheostat 70 shunted by the series connected rheostat 71 in switch contact 72. The contact 72 is biassed into its closing position by a spring 73 and is opened periodically by cam 74 mounted on shaft 75 rotated by mechanism not shown.

At any selected frequency of operation of the contact 72, variation of the rheostats 70 and 71 permits variation of the intensity from its mean value.

In FIG. 12, the rheostat 70 is in series connection with the rheostat 76 in parallel connection with contact 77 biassed to its closing position by spring 78. The moving contact of the rheostat 70 is connected to a second contact 80 biassed to its opened position by a spring 81. Both contacts 77 and 80 are operated by a single cam 82 mounted on shaft 83 rotated by mechanism not shown.

With the working parts in the positions shown in FIG. 12, rheostat 70 set to provide a flux intensity for a selected discharge is connected into the circuit of winding 32. Rotation of cam 82 in the direction of the arrow then closes contact 80 so decreasing the effective value of rheostat 70 by the section 84, itself set to provide a requisite increase influx intensity sufficient to reduce the discharge without actually stopping it. Further rotation of cam 82 permits contact 80 to open returning rheostat 70 to its initial value. Further rotation of the cam opens contact 77 thus placing into circuit a portion of rheostat 76 selected to reduce flux intensity to a value sufficient to produce a desired increase in the discharge.

Instead of being given a continuous rotary movement, the cam 82 could be oscillated through an arc of movement equal to, or a little greater than 180°.

In both cases, the profile of the cam, contacts 77 and 80 and motion imparted to the cam are arranged to produce a required rate and amplitude of variation of discharge.

In all the embodiments described above, maintenance of a required discharge depends upon the correct functioning of all the components and failure may cause emptying of the treatment apparatus. It is therefore necessary to provide means whereby emptying is avoided.

Figure 13:
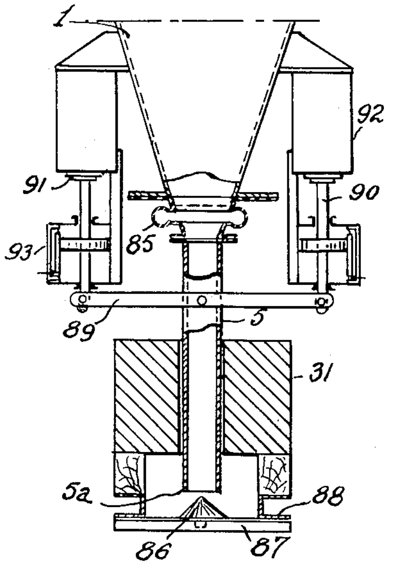
Figure 14:
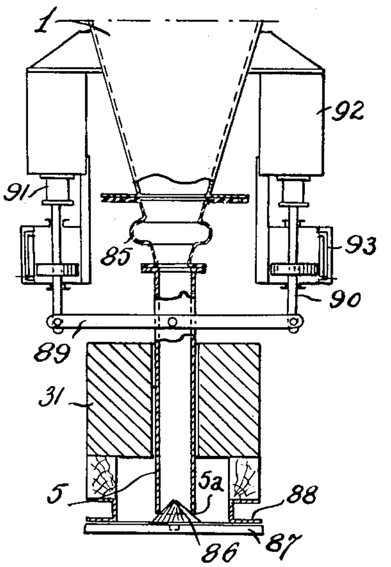

FIGS. 13 and 14 show one form of such means. In these figures, which show part of the vessel 1 and its discharge outlet 5, the latter is made movable and is joined to the vessel by a flexible connecting member 85. The lower end *5a* of the outlet 5 can be closed by a plug 86 carried by a cross member 87 of a frame 88 fixed relative to the vessel 1. The electromagnet 31 is shown mounted upon the frame 88. The movable outlet 5 is carried between parallel rods 89 attached at their ends to extensions 91 of the cores of electromagnets 92 whose windings are not shown but which are energised in series with the winding of the electromagnet 31 and are preferably connected in series with the latter winding.

With the windings thus connected and energising current flowing through the three windings, electromagnets 92 are energised and lift the outlet 5 so that its end *5a* is clear of the plug 86 and the discharge of products can take place. This is shown in FIG. 13.

Failure of current flow causes de-energisation of electromagnets 92 and the outlet 5 drops under gravity thus causing the plug 86 to close the end *5a* and stopping the discharge. If desired, springs or other means could be provided for increasing the rate at which discharge is stopped.

In some of the arrangements described above the energising winding of the electromagnet 31 is periodically, momentarily de-energised and it is desirable that such momentary de-energisations do not produce cessation of discharge. Therefore, "dashpots" are fitted in the connections between the members 89 and the armatures of the electromagnets 91, 92 to delay slightly response to de-energisation of the latter, thus preventing cessation of discharge on momentary de-energisation.

Figures 15, 16:
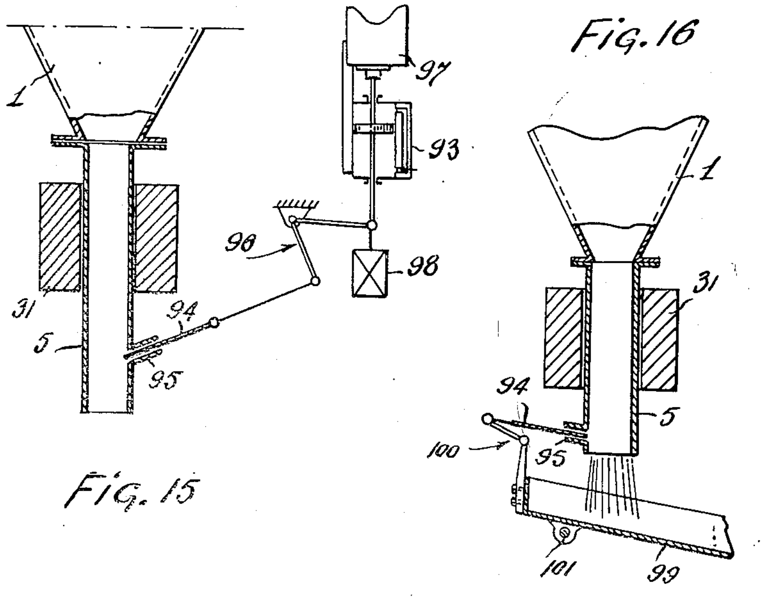

In an alternative arrangement shown in FIG. 15, the outlet 5 is fixed and is formed at 95 to receive a vane 94 connected by a linkage 96 to the armature of an electromagnet 97. The vane is held in the position shown as long as the electromagnet is energised but on deenergization a weight 98 fixed to the linkage causes the vane to project into the outlet and stop discharge therethrough. Again, a dashpot 93 is fitted to prevent response to momentary de-energisation of electromagnet 97.

It will be understood that the winding of the electromagnet 97 is energized in series with the winding of the electromagnet 31 so that when the latter is de-energized the arrangement operates in the manner just described.

Another arrangement is shown in FIG. 16, in which motive power for stopping discharge is derived from the discharge itself. The outlet 5 is adapted to receive a vane 94 as in FIG. 15, the vane being connected by a linkage 100 to a chute 99 which receives the discharge. The chute is pivotally mounted at 101 and the system is adjusted and arranged so that with a normal discharge, the vane 94 is fully retracted but in the event of an excessive discharge, the chute 99 pivots and causes the vane 94 to project into the outlet 5.

Referring back now to the embodiment of the invention shown in FIG. 1, it has already been explained that vessel 16 has an outlet 18 the flow through which to tank 13 is controlled by valve 19. If the circulating pump 26 is powered by an electric motor fed from the same power source as the electromagnet 31 then it is desirable that the valve 19 be closed to stop flow through outlet 18 in the event of failure of the power source. This may be achieved by the arrangement shown in FIG. 1 in which valve 19 is held open by an electromagnet 104 via a linkage 102 against the action of a weight 103. If the electromagnet 104 is energized in series with the motor driving pump 26, then failure of the power source produces deenergization of electromagnet 104 and weight 103 moves valve 19 to its closed position. Alternatively, electromagnet 104 could be energized in series with electromagnet 31.

In the description of FIG. 1 given above, it has been assumed that the liquid medium is a suspension of particles having magnetic properties. However, the invention may be used with treatment apparatus other than that employing a liquid medium comprising a suspension of magnetic particles, using for example, water.

Figure 2:
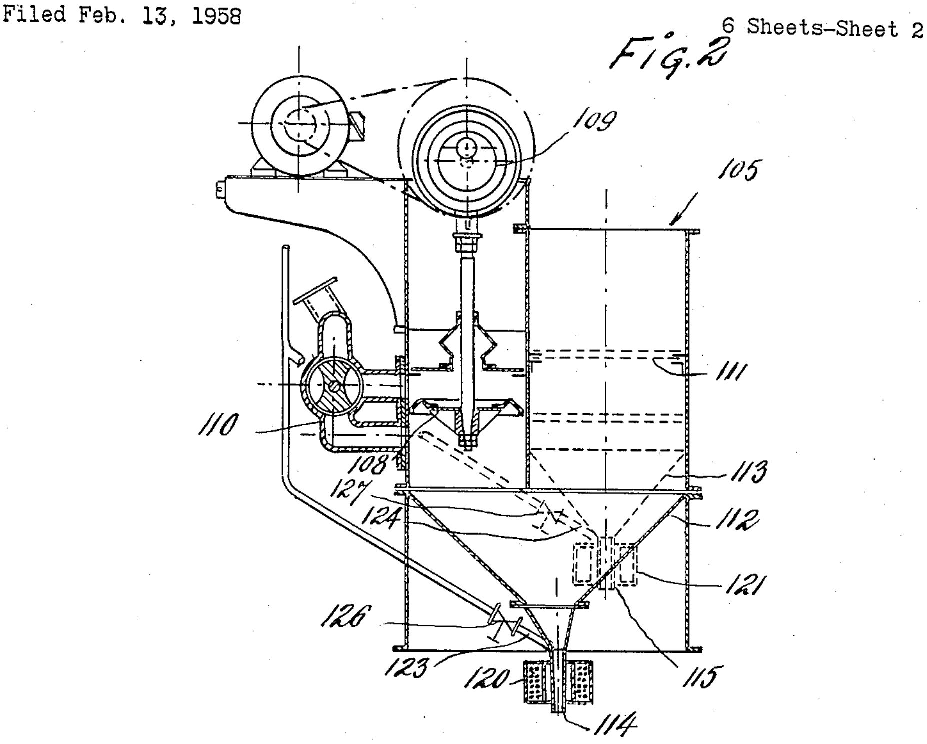
FIG. 2 is a diagrammatic view of a jig or classifier for treating granular materials in which the invention is applied.

For example, the invention may be applied to the so-called "jigging" apparatus of which one form is shown in FIG. 2 and indicated generally by the numeral 105. The operation of such apparatus is well known. Pulsations produced by a piston 108 reciprocated by an eccentric 109 cause separation of material fed on to a screen 111. If necessary, the suction effects of the movement of piston 108 are compensated by a device 110. Light products are reclaimed from upper separation beds at the end of the screen whilst heavy products of small size pass through the screen and are collected in tank 112, those of large size being discharged at the end of the screen into a vessel 113.

The tank 112 and vessel 113 having lower outlets 114 and 115 respectively discharge from which may be controlled in the manner described above or as will now be described.

Each discharge outlet has an electromagnet similar to electromagnet 31 described above. Thus, outlet 114 is fitted with electromagnet 120 and outlet 115 with electromagnet 121. Entering the outlets 114, 115 at points adjacent the respective electromagnets are conduits 123, 124 respectively connected to a common feed tank (not shown in FIG. 2). The feed tank contains a suspension of particles having magnetic properties, examples being given above, and flow through the respective conduits is controlled by valves 126 and 127. Particles fed into the outlets 114, 115 form the dam or stopper described above and control the escape of liquid treatment medium.

Figure 3:
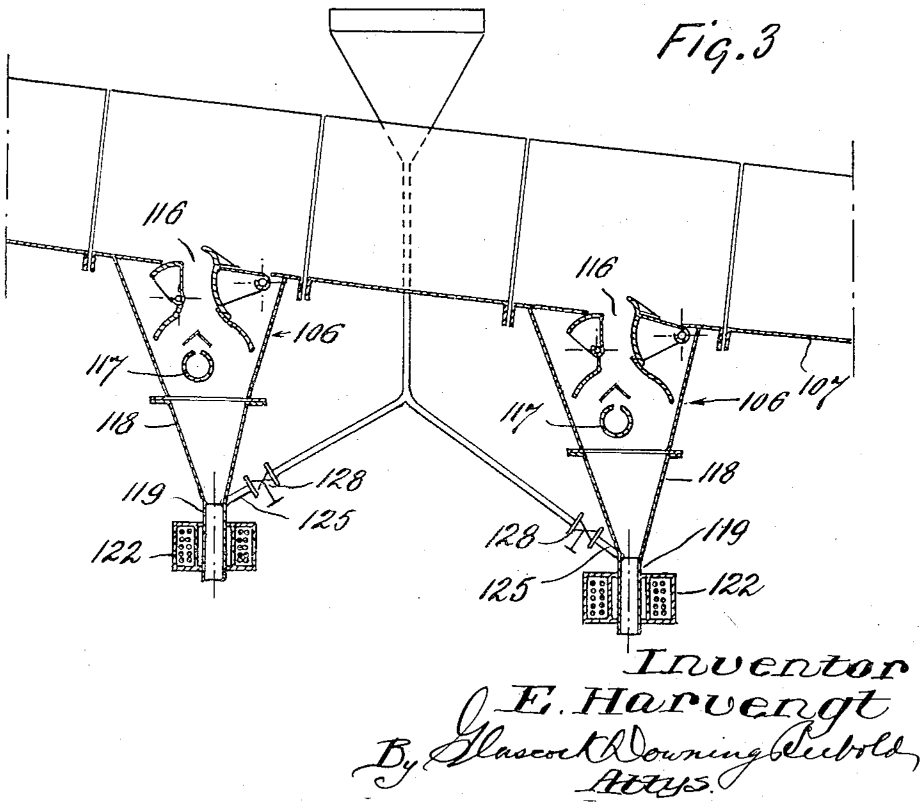
FIG. 3 is a diagrammatic view of an installation for treating granular materials in a trough equipped with extraction apparatus.

A further embodiment is shown in FIG. 3, there being a trough 107 for the alluvial treatment of material. The trough has a plurality of adjustable-width slots 116 in its base permitting deposits on the floor of the trough to be washed by sprays 117 into vessels 106. The vessels have lower portions 118 in which the products collect for ultimate discharge through lower outlets 119 controlled in a manner similar to that of outlet 5 or in a manner similar to that just described relative to FIG. 2. Conduits 125 leading from a common feed tank join the outlets 119 adjacent electromagnets 122 and are fitted with control valves 128. A suspension of magnetic particles fed through the conduits enable the dam or stopper to be built up in the outlets to control the escape of liquid treatment medium.

Figure 17:
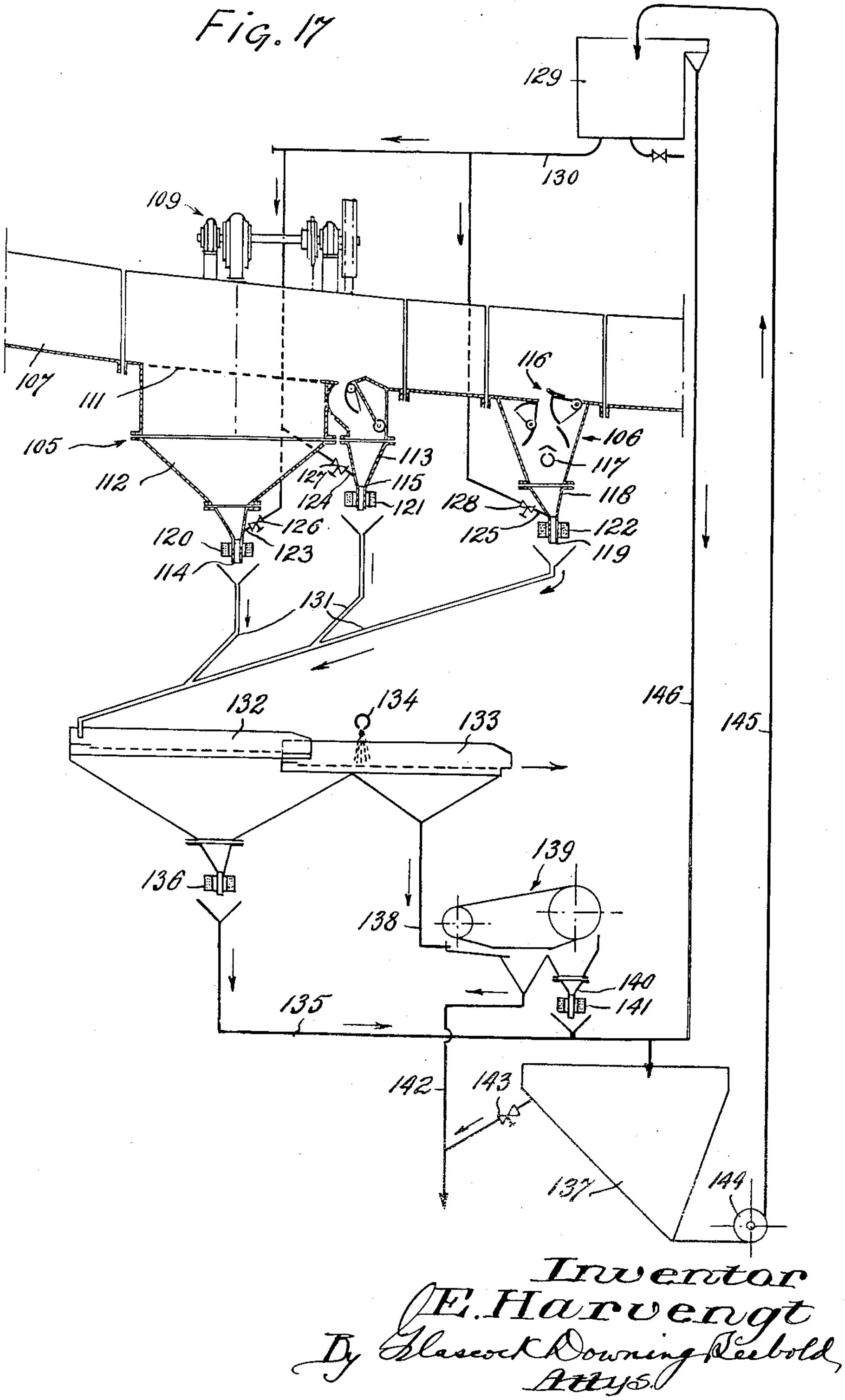
FIG. 17 shows certain auxiliary arrangements of an installation for the trough treatment of granular materials in which the invention is applied.

FIG. 17 shows a jigging apparatus 105 and extracting apparatus 106 fed from a trough 117 for the purposes of simplification products from various outlets 114, 115, 119 have been shown as being collected together for common treatment.

The liquid medium for the apparatus of FIG. 17 is, again, one not containing magnetic particles for example water.

For controlling the discharges through the orifices, each is fitted with an electromagnet at 120, 121, 122 respectively and a dam or stopper is established by feeding into the outlet in the vicinity as at 123, 124 and 125 respectively of the electromagnet a suspension of magnetic particles. The suspension is supplied from a feed tank 129 via conduit 130 fitted with control valves 126, 127, 128 for regulating the flow to the various outlets.

As before, the fields created by the electromagnets 120, 121, 122 produce dams or stoppers which are impermeable or practically so to treatment liquid yet which permit the discharge of solid products.

The products are collected, with perhaps a small volume of treatment liquid, and suspension of magnetic particles and conveyed through conduit 131 to a draining screen 132 from whence they pass to a second screen 133 on which adhering magnetic particles are separated by means of sprays 134 and products are finally discharged.

Liquid passing through screen 132 and that passing through part of screen 133 is collected and discharged via outlet fitted with a demagnetising coil 136 to a conduit 135 which conveys it to a vessel 137. Liquid passing through the other part of screen 133 passes via conduit 138 to a magnetic separator of known kind indicated diagrammatically at 139 and thence via outlet 140 fitted with demagnetiser 141 into the vessel 137. Treatment water is discharged via conduit 142.

The vessel 137 thus receives practically all of the particles having magnetic properties and after removal of excess liquid are returned via pump 144 to feed tank 129.

It will be understood that the "consistency," concentration or permeability of the stopper of magnetic particles may be varied within wide limits to suit any required rate of discharge of particular products. The invention can also be applied to the control of the discharge of a homogeneous suspension of solid particles and to the control of discharge of a simple liquid.

I claim:

1. An apparatus for treating granular material for continuously separating light and heavy particles therefrom comprising a tank having an inner wall converging downwardly to a discharge orifice which is small relative to the cross-sectional area of the uppermost portion of the tank, means for continuously feeding to the tank the granular material to be treated together with a liquid containing suspended magnetizable particles therein, an open conduit member forming a passageway for the discharged material extending from the orifice, means for producing a magnetic field only in the passageway for magnetizing the magnetizable particles to cause them to adhere together to form a condensed mass across the passageway for providing a barrier to the flow of heavy material which falls down in the suspension of magnetizable particles in the tank whereby an accumulation of granular material is supported by said barrier, the magnetic field being of such intensity as to maintain said barrier for supporting its own weight and the predetermined weight of accumulated granular material, said mass becoming permeable by partial collapse thereof upon such accumulation exceeding the predetermined weight.

2. An apparatus according to claim 1 including means for varying the intensity of the magnetic field to vary the permeability of the barrier.

3. An apparatus for treating granular material for the separation of light and heavy particles therefrom comprising a tank for receiving the granular material to be treated together with a liquid containing suspended magnetizable particles therein, a discharge orifice formed in the lower portion of the tank, a conduit member forming a passageway for the discharged material extending from the orifice, means for producing a magnetic field in the passageway for magnetizing the magnetizable particles to cause them to adhere together to form a condensed mass across the passageway for providing a barrier to the flow of material from the tank whereby an accumulation of granular material is supported by said barrier, the magnetic field being of such intensity as to maintain said barrier for supporting a predetermined weight of accumulated granular material and to become permeable by partial collapse thereof upon such accumulation exceeding the predetermined weight, blocking means mounted for movement adjacent the discharge end of the passageway for blocking said passageway to prevent discharge of material therefrom and normally positioned to unblock the passageway, and means mounted for receiving the discharged material from the passageway and connected to the blocking means for moving it into blocking position upon receiving a predetermined weight of discharged material.

4. An apparatus according to claim 1 in which the means for producing the magnetic field comprises an electromagnet associated with said passageway for producing a field transverse thereto.

5. An apparatus according to claim 4 in which the electromagnet includes a pair of opposed pole pieces extending over at least part of the length of the passageway for producing a magnetic field thereacross, a source of current connected to the winding of the electromagnet, and means for varying the current through the winding to control the intensity of the magnetic field.

6. An apparatus for treating granular material for the separation of light and heavy particles therefrom comprising a tank for receiving the granular material to be treated together with a liquid containing suspended magnetizable particles therein, a discharge orifice formed in the lower portion of the tank, a conduit member forming a passageway for the discharged material extending from the orifice, means for producing a magnetic field in the passageway for magnetizing the magnetizable particles to cause them to adhere together to form a condensed mass across the passageway for providing a barrier to the flow of material from the tank whereby an accumulation of granular material is supported by said barrier, the magnetic field being of such intensity as to maintain said barrier for supporting a predetermined weight of accumulated granular material and to become permeable by partial collapse thereof upon such accumulation exceeding the predetermined weight, the means for producing the magnetic field comprising an electromagnet associated with said passageway for producing a field transverse thereto, the electromagnet including a pair of opposed relatively movable pole pieces extending over at least part of the length of the passageway, and means for moving said pole pieces toward and away from each other to vary the magnetic field intensity.

7. An apparatus for treating granular material for the separation of light and heavy particles therefrom comprising a tank for receiving the granular material to be treated together with a liquid containing suspended magnetizable particles therein, a discharge orifice formed in the lower portion of the tank, a conduit member forming a passageway for the discharged material extending from the orifice, means for producing a magnetic field in the passageway for magnetizing the magnetizable particles to cause them to adhere together to form a condensed mass across the passageway for providing a barrier to the flow of material from the tank whereby an accumulation of granular material is supported by said barrier, the magnetic field being of such intensity as to maintain said barrier for supporting a predetermined weight of accumulated granular material and to become permeable by partial collapse thereof upon such accumulation exceeding the predetermined weight, the means for producing the magnetic field comprising an electromagnet associated with said passageway for producing a field transverse thereto, the means for varying the current through the winding including means responsive to variations in the rate of discharge of the material from the passageway for controlling the current through the winding to maintain a predetermined rate of discharge.

8. An apparatus according to claim 7 further including means for periodically deenergizing the electromagnet.

9. An apparatus according to claim 4 in which the means for varying the current through the winding includes a light source for projecting a light through the material discharged from the passageway, a photo-electric cell for receiving the light projected through the material and responsive to the opacity of the material for controlling the current varying means to maintain a predetermined rate of discharge.

10. An apparatus according to claim 9 further including means for periodically deenergizing the electromagnet.

11. An apparatus for treating granular material for the separation of light and heavy particles therefrom comprising a tank for receiving the granular material to be treated together with a liquid containing suspended magnetizable particles therein, a discharge orifice formed in the lower portion of the tank, a conduit member forming a passageway for the discharged material extending from the orifice, means for producing a magnetic field in the passageway for magnetizing the magnetizable particles to cause them to adhere together to form a condensed mass across the passageway for providing a barrier to the flow of material from the tank whereby an accumulation of granular material is supported by said barrier, the magnetic field being of such intensity as to maintain said barrier for supporting a predetermined weight of accumulated granular material and to become permeable by partial collapse thereof upon such accumulation exceeding the predetermined weight, the means for producing the magnetic field comprising an electromagnet associated with said passageway for producing a field transverse thereto, means for preventing the discharge of material from the conduit member upon deenergization of the electromagnet comprising, a valve member for obstructing the discharge end of the conduit member, means mounting one of said members for movement relative to the other for normally obstructing the discharge end of the conduit member, and means connected to said one member and responsive to energization of the electromagnet for moving said one member to open the discharge end of the conduit member.

12. An apparatus according to claim 11 in which the means mounting one of said members for movement comprises a flexible connection between the conduit member and the tank.

13. An apparatus according to claim 11 in which the one said member mounted for movement is the valve member.

14. An apparatus according to claim 13 in which the valve member is in the form of a vane movable into the passageway of the conduit member.

15. In the treatment of granular material in a vessel having a converging wall leading to an opening adjacent its lower end and a conduit forming an open discharge passage commuicating with and extending downwardly from the opening wherein a mixture including the granular material, a liquid and magnetizable particles is placed in the vessel, the method of discharging the material from the vessel which comprises establishing a magnetic field only in the passageway to attract the magnetizable particles to form in the passageway a condensed mass of the granular and magnetizable particles and which is normally impermeable to the mixture and adjusting the magnetic field to a fixed intensity so as to condense the mass to a predetermined density capable of supporting its own weight and a predetermined weight of granular material in the tank settling thereon but to partially collapse when the predetermined weight is exceeded to render the mass permeable to the material.

16. A method according to claim 15 including varying the intensity of the magnetic field to vary the permeability of the condensed mass.

References Cited in the file of this patent

UNITED STATES PATENTS

| | | |
|---|---|---|
| 2,670,749 | Germer | Mar. 2, 1954 |
| 2,691,442 | Wallach | Oct. 12, 1954 |
| 2,902,153 | Green | Sept. 1, 1959 |

FOREIGN PATENTS

| | | |
|---|---|---|
| 607,821 | Great Britain | Sept. 6, 1948 |